(12) United States Patent
Garcia-Herreros et al.

(10) Patent No.: US 12,266,998 B2
(45) Date of Patent: Apr. 1, 2025

(54) STATOR COOLING ASSEMBLY FOR A LINEAR MOTOR

(71) Applicant: ETEL S.A., Motiers (CH)

(72) Inventors: Ivan Garcia-Herreros, Saint-Sulpice (CH); Jean-Yves Grillon, Granges-Narboz (FR); Jean Lefevre, La Cluse et Mijoux (FR)

(73) Assignee: ETEL S.A., Motiers (CH)

( * ) Notice: Subject to any disclaimer, the term of this patent is extended or adjusted under 35 U.S.C. 154(b) by 319 days.

(21) Appl. No.: 18/157,859

(22) Filed: Jan. 23, 2023

(65) Prior Publication Data
US 2023/0261548 A1    Aug. 17, 2023

(30) Foreign Application Priority Data

Feb. 14, 2022    (EP) .................................... 22156490

(51) Int. Cl.
*H02K 9/20* (2006.01)
*H02K 9/22* (2006.01)
*H02K 41/00* (2006.01)

(52) U.S. Cl.
CPC ............ *H02K 9/225* (2021.01); *H02K 9/20* (2013.01); *H02K 2213/12* (2013.01)

(58) Field of Classification Search
CPC .. H02K 9/00; H02K 9/19; H02K 9/20; H02K 9/22; H02K 9/225; H02K 9/227; H02K 9/24; H02K 41/00; H02K 41/02; H02K 41/03; H02K 5/00; H02K 5/20; H02K 5/203
See application file for complete search history.

(56) References Cited

U.S. PATENT DOCUMENTS 3,877,518 A * 4/1975 Dreksler ................... F28F 9/26
                                                    285/134.1
5,783,877 A * 7/1998 Chitayat ................... H02K 9/24
                                                    310/12.33
(Continued)

FOREIGN PATENT DOCUMENTS

CN    212572273 U    2/2021
DE    19604643 B4    4/2004
EP     1354392 B1    5/2004

*Primary Examiner* — Tran N Nguyen
(74) *Attorney, Agent, or Firm* — LEYDIG, VOIT & MAYER, LTD.

(57) ABSTRACT

A stator cooling assembly for a linear motor includes a stator and a modular cooling arrangement. The modular cooling arrangement comprises: a U-shaped fluid cooling pipe having first and second linear segments extending along first and second opposite longitudinal sides of the stator; an inlet and outlet port connected to a free end of the first and second linear segments, respectively, for circulating a cooling fluid; a central cooling arrangement comprising primary cooling units mounted into recesses of the stator; and connecting members connecting the central cooling arrangement to the fluid cooling pipe. Each primary cooling unit comprises a heat pipe having first and second portions extending along a recess of the stator and along a portion of the fluid cooling pipe, respectively. The connecting members connect the second portion of the heat pipe of each primary cooling unit to corresponding portions of the fluid cooling pipe.

19 Claims, 5 Drawing Sheets

(56) References Cited

U.S. PATENT DOCUMENTS

| | | | |
|---|---|---|---|
| 6,661,124 B1* | 12/2003 | Seki | H02K 41/031 |
| | | | 310/58 |
| 6,822,352 B2 | 11/2004 | Nimz et al. | |
| 7,309,931 B2 | 12/2007 | Hoppe | |
| 9,698,641 B2 | 7/2017 | Folie et al. | |
| 2004/0032170 A1 | 2/2004 | Tamai et al. | |
| 2009/0261668 A1* | 10/2009 | Mantere | H02K 5/203 |
| | | | 310/54 |
| 2019/0154300 A1* | 5/2019 | Kondo | F28D 7/16 |

* cited by examiner

STATOR COOLING ASSEMBLY FOR A LINEAR MOTOR

CROSS REFERENCE TO RELATED APPLICATION

This application claims benefit to European Patent Application No. EP 22156490.9, filed on Feb. 14, 2022, which is hereby incorporated by reference herein.

FIELD

The present invention relates to a stator cooling assembly for a linear motor, comprising a stator and a modular cooling arrangement mounted on the stator for heat dissipation. The invention also relates to a linear motor comprising the stator cooling assembly.

BACKGROUND

Conventional approaches to dissipate heat on electric motors rely on the thermal conductivity of motor components to transport heat. However, generally motor components need to provide high electrical resistance for safety and operating reasons. High electrical resistance typically comes with high thermal resistance, thus traditional cooling strategies are limited by this factor.

Liquid-cooled stators for linear motors are well-known in the art and many solutions have been proposed.

EP1354392B1, for example, discloses a cooled stator for a linear motor, comprising a stator having a magnetic laminated core and a cooling arrangement mounted on the stator. The cooling arrangement is made of a first and a second corrugated metal hose for flowing a cooling medium along the longitudinal direction of the stator. The first corrugate metal hose is arranged to form a serpentine flow path mainly in bores of the laminated core while the second corrugated metal hose is arranged on top of the first corrugate metal hose to form a serpentine flow path in the slots of the stator.

The cooling arrangement of EP1354392B1 has several disadvantages. This cooling arrangement is not modular and designing and producing a cooling arrangement specific to a particular motor length may be tedious, time consuming and therefore costly since every motor with a different length needs a specific corrugated hose shape. Significant pressure drop may also occur due to the significant length and multiple turns of the cooling arrangement. This cooling arrangement has also a negative impact on the motor performance as electrically conductive cooling hose are inserted in the slots of the stator where strong magnetic fields are present.

U.S. Pat. No. 7,309,931B2 discloses an electric linear motor comprising a heat-generating motor part, and a modular cooling arrangement. The cooling arrangement has a meandering configuration and is secured to the motor part for removal of heat. The cooling arrangement comprises separate straight cooling pipes, and separate deflections for attachment and interconnection of the straight cooling pipes. The deflection includes two separate elbows made of plastic and a coupling section for connecting the elbows to one another, with one of the elbows made in one piece with the coupling section.

This cooling arrangement is modular at the cost of additional complexity and at the risk of cooling fluid leakage at the joints between segments.

DE19604643B4 discloses a linear motor comprising a cooling arrangement including pipes press-fitted into slots located at the back of the lamination stack of the magnetic core, thus avoiding degrading the motor performance. Placing the cooling arrangement at the back of the lamination stack has however the drawback to significantly reduce the cooling capacity of the cooling arrangement.

SUMMARY

In an embodiment, the present invention provides a stator cooling assembly for a linear motor. The stator cooling assembly includes a stator and a modular cooling arrangement mounted on the stator. The modular cooling arrangement comprises: a U-shaped fluid cooling pipe having a first linear segment extending along a first longitudinal side of the stator and a second linear segment extending along a second longitudinal side of the stator, opposite the first longitudinal side; an inlet and an outlet port connected to a free end of the first and second linear segments, respectively, of the U-shaped fluid cooling pipe for circulating a cooling fluid along the first and second longitudinal sides of the stator; a central cooling arrangement comprising primary cooling units mounted into respective recesses of the stator extending across the stator from the first to the second longitudinal side; and connecting members connecting the central cooling arrangement to the U-shaped fluid cooling pipe. Each of the primary cooling units comprises at least one heat pipe having a first portion extending along the respective recess of the stator, and a second portion extending along a portion of the U-shaped fluid cooling pipe. The connecting members connect the second portion of the at least one heat pipe of each of the primary cooling units to corresponding portions of the U-shaped fluid cooling pipe

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
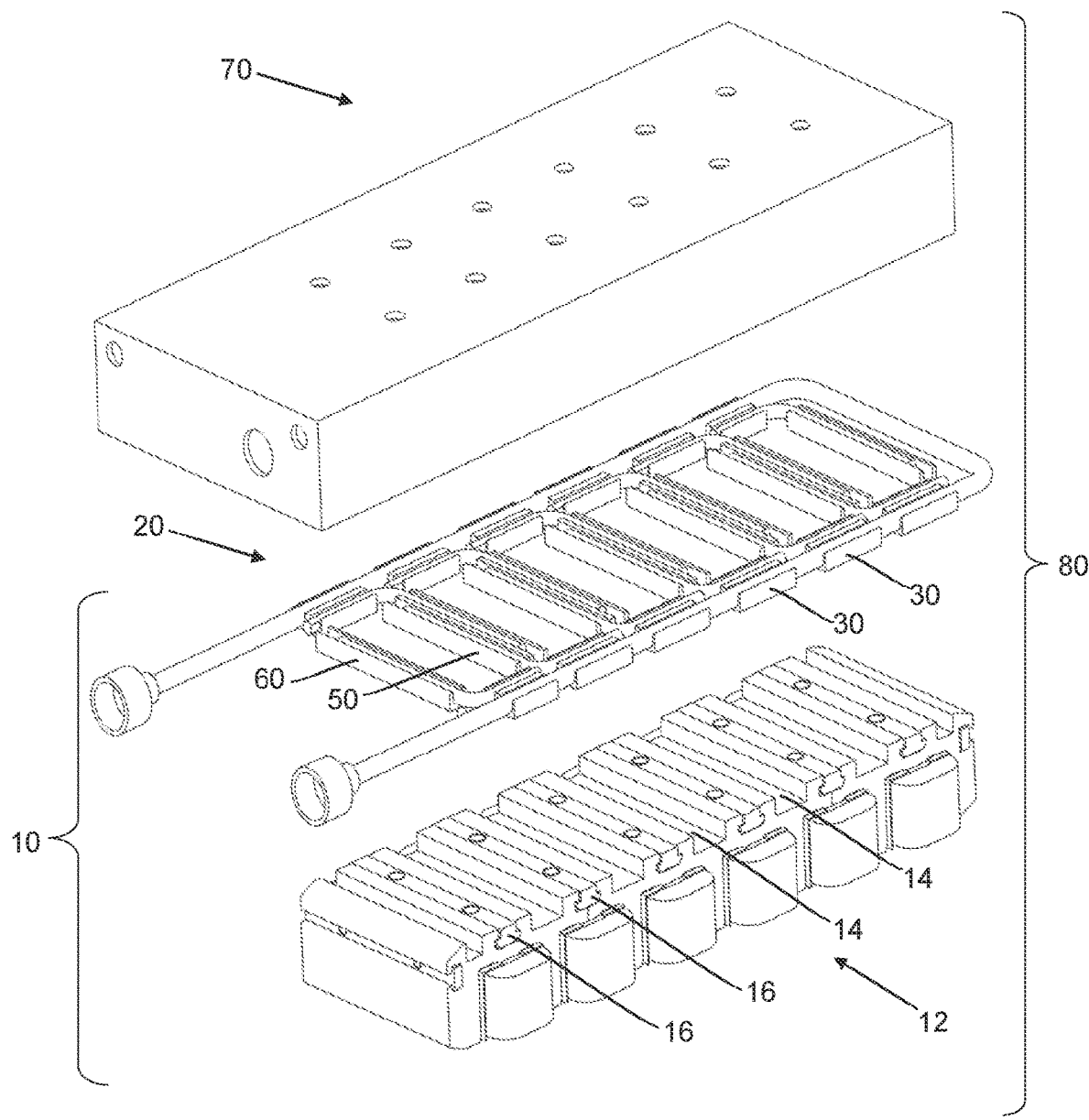
FIG. 1 shows an exploded view of a primary part of a linear motor comprising a stator, a modular cooling arrangement and a housing according to an embodiment of the invention.

An aim of embodiments of the present invention is to provide a stator cooling assembly for a linear motor, comprising a modular cooling arrangement which overcomes the above limitations.

More particularly, an aim of embodiments of the present invention is to provide a stator cooling assembly for a linear motor, comprising a modular cooling arrangement that is easy to manufacture and cost effective.

Another aim of embodiments of the present invention is to provide a stator cooling assembly for a linear motor, comprising a modular cooling arrangement that produces insignificant pressure drop occurring along the cooling arrangement.

A further aim of embodiments of the present invention is to provide a stator cooling assembly for a linear motor, comprising a modular cooling arrangement presenting a lower risk of leakage.

These aims are achieved by a stator cooling assembly for a linear motor according to an embodiment of the present invention, comprising a stator and a modular cooling arrangement mounted on the stator. The modular cooling arrangement comprises:
- a U-shaped fluid cooling pipe comprising a first linear segment extending along a first longitudinal side of the stator and a second linear segment extending along a second longitudinal side of the stator, opposite the first longitudinal side,
- an inlet and an outlet port connected to a free end of the first and second linear segments respectively of the fluid cooling pipe for circulating a cooling fluid along both longitudinal sides of the stator,
- a central cooling arrangement comprising primary cooling units mounted into respective recesses of the stator extending across said stator from the first to the second longitudinal side, and
- connecting members connecting the central cooling arrangement to the U-shaped fluid cooling pipe.

Each primary cooling unit comprises at least one heat pipe having a first portion extending along the corresponding recess of the stator, and a second portion extending along a portion of the U-shaped fluid cooling pipe. The connecting members connect the second portion of the at least one heat pipe of each primary cooling unit to the corresponding portions of the U-shaped fluid cooling pipe.

In an embodiment, the at least one heat pipe of each primary cooling unit of the central cooling arrangement is L-shaped.

In an embodiment, each primary cooling unit comprises a first and a second L-shaped heat pipe comprising each the first and second portions. The first portion of the first and second L-shaped heat pipes of each primary cooling unit extends along the recess. The second portion of the first and second L-shaped heat pipes of each primary cooling unit extends along a portion of respectively the first and second linear segments of the U-shaped fluid cooling pipe.

In an embodiment, each connecting member comprises two pipe receiving portions parallel to each other. One receiving portion receives a portion of either the first and second linear segments of the U-shaped fluid cooling pipe. The other receiving portion receives the second portion of either the first and second L-shaped heat pipes of the corresponding primary cooling unit. The pipe receiving portions are for example in the form of grooves extending across the connecting member or in the form of through-holes extending through said connecting member.

In an embodiment, each primary cooling unit comprises a primary insert having a first and a second pipe receiving portion, for example a first and a second groove, parallel to each other and receiving respective first portions of the first and second L-shaped heat pipes.

In an embodiment, the modular cooling arrangement further comprises two secondary cooling units arranged into recesses of the stator extending along both sides of the central cooling arrangement. Each secondary unit comprises a single L-shaped heat pipe having a first and a second portion extending respectively along the recess and along a portion of respective first and second linear segments.

In an embodiment, each secondary cooling unit comprises a secondary insert having a single pipe receiving portion, for example a groove, receiving the first portion of the single L-shaped heat pipe.

In an embodiment, the primary and secondary inserts of respective primary and secondary cooling units are press-fitted into the corresponding recesses of the stator.

In an embodiment, the primary and secondary inserts and the connecting members are made of metal having a thermal conductivity coefficient exceeding 200 W m$^{-1}$ K$^{-1}$ at 20° C. and 1 bar, such as aluminum or copper.

In an embodiment, the second portion of the first L-shaped heat pipe of each primary cooling unit extends along the first linear segment of the U-shape fluid cooling pipe in a first direction. The second portion of the second L-shaped heat pipe of each primary unit extends along the second linear segment of the U-shape fluid cooling pipe in a second direction opposite the first direction.

In an embodiment, the cross-section of the L-shaped heat pipes is smaller than the cross-section of the U-shaped fluid cooling pipe.

In an embodiment, the U-shaped fluid cooling pipe further comprises a third linear segment between the first and second linear segments. The third linear segment extends along a lateral side of the stator.

Another embodiment of the invention provides a primary part of a linear motor, comprising the stator cooling assembly as described above and a housing arranged to encapsulate the stator cooling assembly.

In an embodiment, spacers are mounted on mounting portions of the stator such that a top side of each spacer is in contact against a bottom side of the housing which is opposite the housing top side to keep the bottom side away from the modular cooling arrangement to avoid excessive heating of the housing.

In an embodiment, the first and second linear segments of the U-shaped fluid cooling pipe are mounted against two opposite longitudinal sides of the housing by means of the cooling members which are fixed to the opposite longitudinal sides of the housing to cool down the housing.

Another embodiment of the invention a linear motor comprising the primary part as described above.

With reference to FIGS. 1 to 4, the primary part 80 of a linear motor comprises a housing 70 encapsulating a stator cooling assembly 10. The stator cooling assembly 10 comprises a stator 12 and a modular cooling arrangement 20 mounted on the stator. The modular cooling arrangement 20 comprises a U-shaped fluid cooling pipe 22 provided with a first and a second port 24, 26 mounted on free ends of the U-shaped fluid cooling pipe 22 for circulating a cooling fluid around a central part of the stator. In this respect, the fluid cooling pipe 22 comprises a first linear segment 23 arranged along a first longitudinal side of the stator, a second linear segment 25 arranged along a second longitudinal side of the stator, opposite to the first longitudinal side and a third linear segment 28 arranged along a lateral side of the stator.

Figure 2:
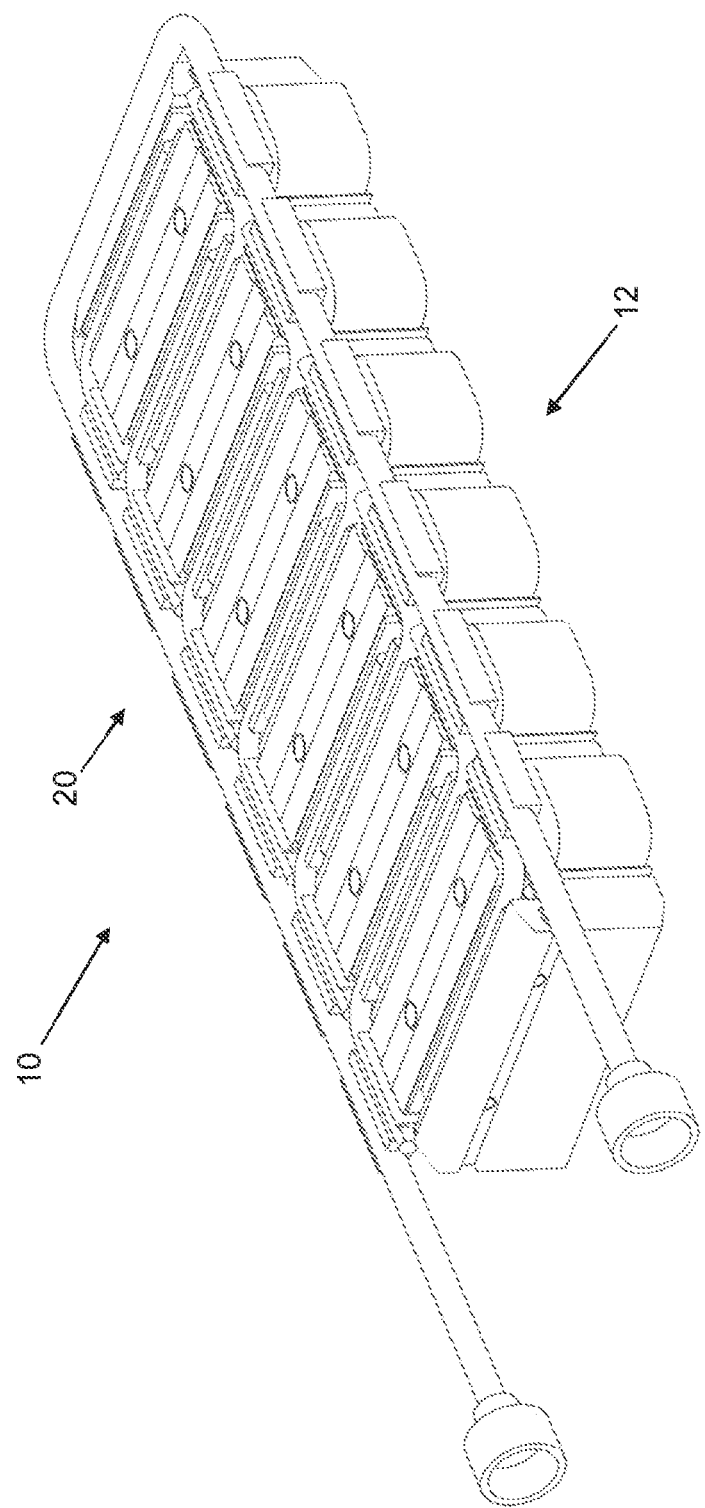
FIG. 2 shows a perspective view of a stator cooling assembly comprising the stator and the modular cooling arrangement of FIG. 1 assembled to the stator.
Figure 5:
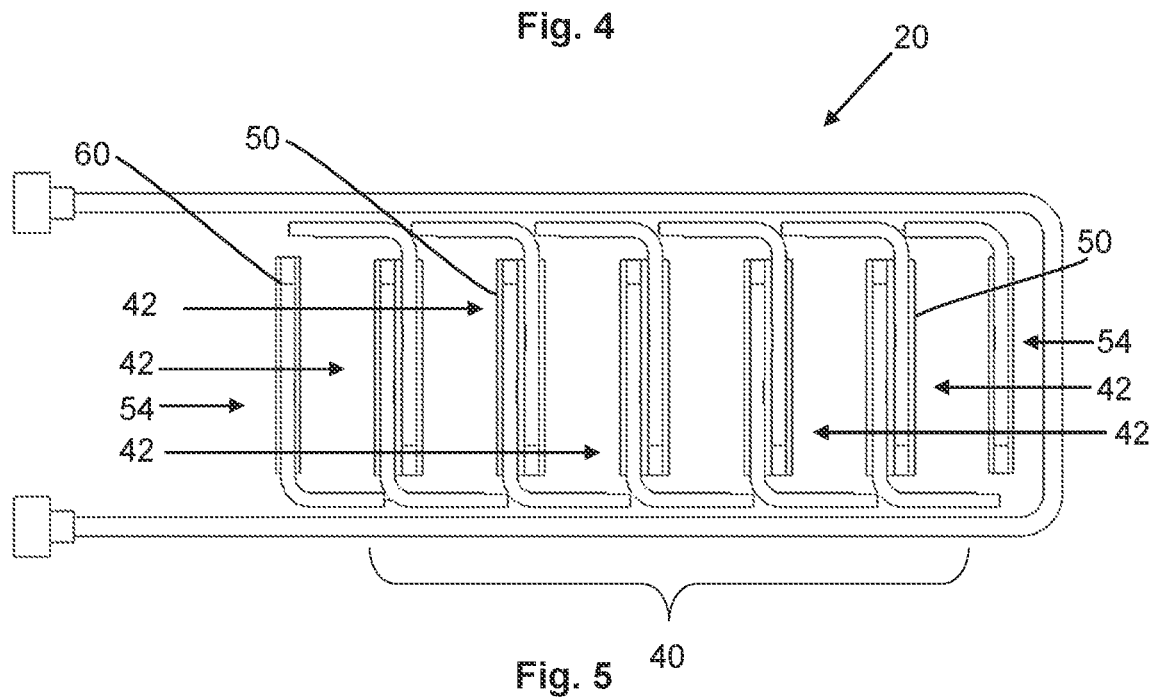
FIG. 5 shows a top view of a central cooling arrangement of the modular cooling arrangement of FIG. 1 surrounded by the U-shaped fluid cooling pipe of FIG. 4.

Referring to FIG. 5, the modular cooling arrangement 20 further comprises a central cooling arrangement 40 mounted on a top side of the stator 12, as shown in FIGS. 1 and 2, and surrounded by the fluid cooling pipe 22.

Figure 6:
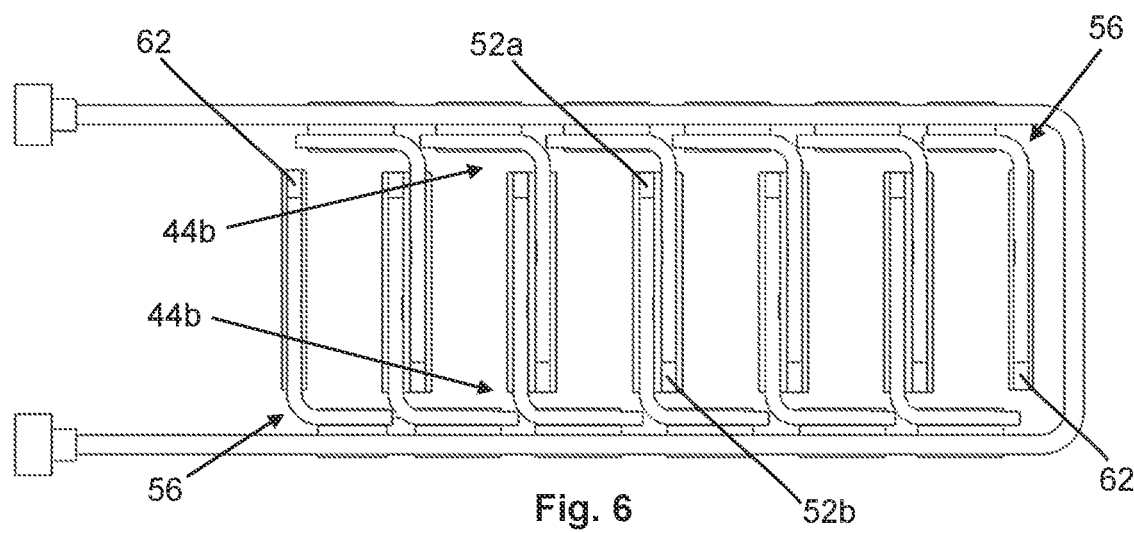
FIG. 6 shows a similar view of FIG. 5 with inserts and connecting members.

The central cooling arrangement 40 comprises primary cooling units 42 mounted into recesses 14 of the stator 12 between mounting portions 16 of the stator as shown in FIG. 1. The recesses 14 extend from the first to the second longitudinal side of the stator. In an embodiment, each primary cooling unit 42 comprises a primary insert 50 adapted to be press-fitted into the respective recesses 14 of the stator as well as a first and a second L-shaped heat pipe 44a, 44b mounted in the primary insert (FIG. 6). To this end, each primary insert 50 comprises pipe receiving portions 52a, 52b for example in the form of parallel grooves, as per the modular cooling arrangement of the illustrated embodiment, extending along the insert 50, or in the form of parallel through-holes extending through the insert according to a non-illustrated variant.

Figure 3:
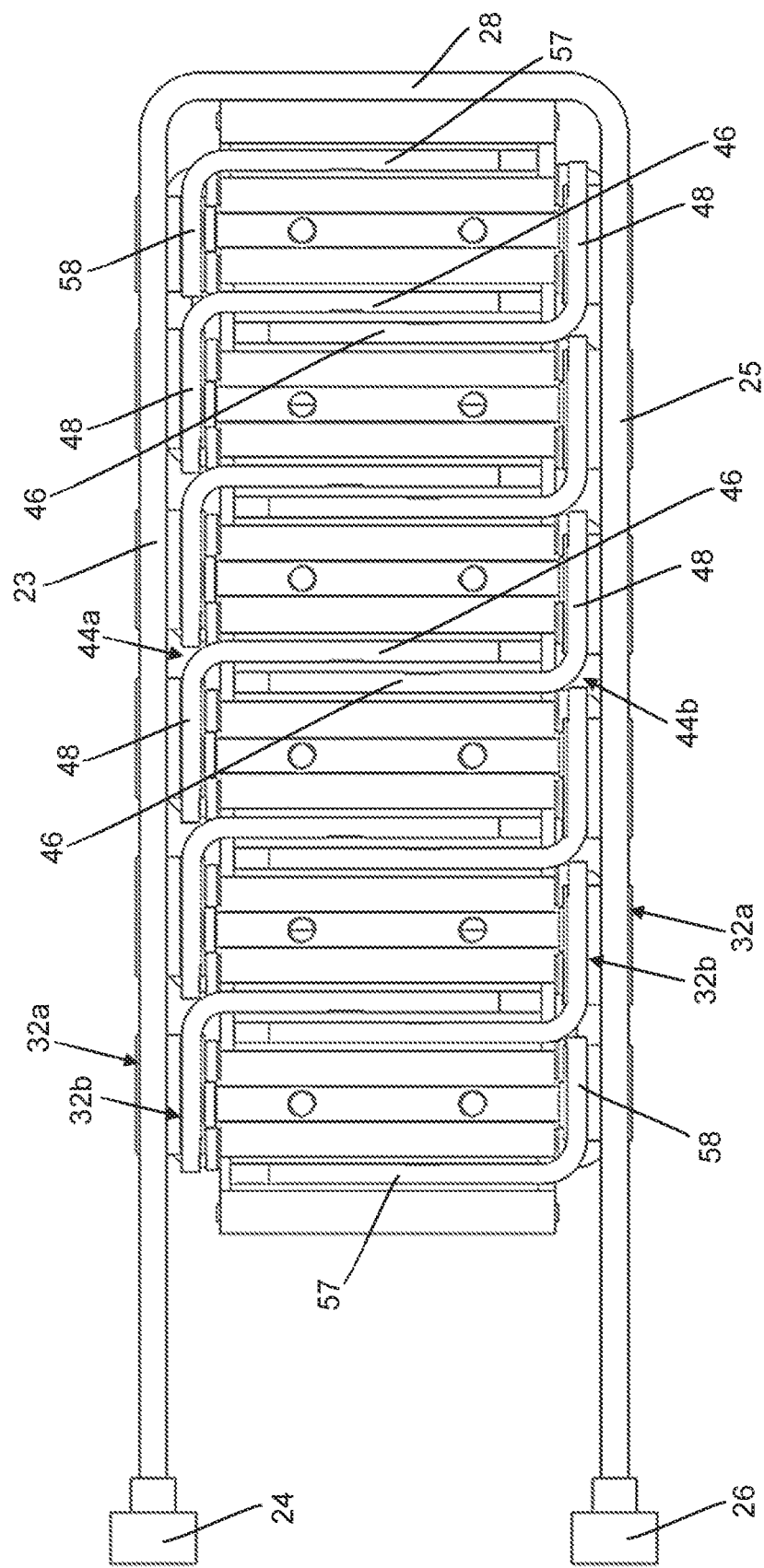
FIG. 3 shows a top view of the stator cooling assembly of FIG. 2.
Figure 4:
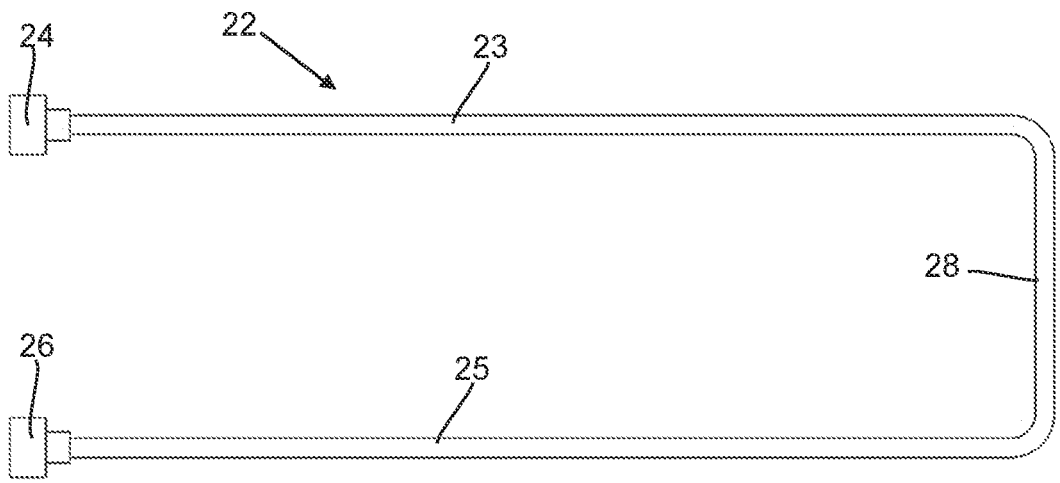
FIG. 4 shows a top view of a U-shaped fluid cooling pipe of the modular cooling arrangement of FIG. 1.

With reference to FIG. 3, the first and second L-shaped heat pipes 44a, 44b of each primary cooling unit comprise each a first portion 46 and a second portion 48. The first portion 46 of the first and second heat pipes 44a, 44b extends along respectively the first and second grooves 52a, 52b of the insert 50. The second portion 48 of the first and second heat pipes 44a, 44b extend along a portion of respectively the first and second linear segments 23, 25 of the U-shaped fluid cooling pipe 20.

In a preferred embodiment, the second portion 48 of the first L-shaped heat pipe 44a of each primary cooling unit 42 extends along the first linear segments 23 in a first direction whereas the second portion 48 of the second L-shaped heat pipe 44b of each primary unit 42 extends along the second linear segment 25 in a second direction opposite the first direction.

With reference to FIG. 5, the modular cooling arrangement 20 further comprises two secondary cooling units 54 mounted into recesses 14 of the stator 12 (FIG. 1) extending along both sides of the central cooling arrangement 40. In an embodiment, each secondary unit 54 comprises a secondary insert 60 with a pipe receiving portion 62 and a single L-shaped heat pipe 56. The width of the secondary insert 60 is approximately half the width of the primary inserts 50. The secondary insert 60 is press-fitted into the corresponding recess 14 of similar width. The single heat pipe 56 comprises a first portion 57 extending along the pipe receiving portion 62, for example along a groove, and a second portion 58 along a portion of respective first and second segments 23, 25 of the fluid cooling pipe 22 as shown in FIG. 3.

The modular cooling arrangement 20 further comprises connecting members 30 connecting the heat pipes to the fluid cooling pipe 22. More particularly, the connecting member 30 comprises two pipe receiving portions 32a, 32b in the form, for example, of parallel grooves. One receiving portion 32a of each connecting member 30 receives a portion of either the first and second linear segments 23, 25 of the fluid cooling pipe 22. The other receiving portion 32b of each connecting member 30 receives the second portion 48 of either the first and second L-shaped heat pipes 44a, 44b of the corresponding primary cooling unit 42 or the second portion 58 of the L-shaped heat pipe 56 of the corresponding secondary unit 54.

The primary and secondary inserts 50, 60 as well as the connecting members 30 are made of metal having a high thermal conductivity coefficient, preferably exceeding 200 W m$^{-1}$ K$^{-1}$ at 20° C. and 1 bar, such as aluminum or copper to maximize heat transfer.

The heat pipes of the primary and secondary cooling units 42, 54 comprise each a working fluid which turns into vapour by absorbing heat from the primary and secondary inserts 50, 60 which are heated by the stator when in operation. The vapour then travels from the first to the second portion of the heat pipes, whereupon the working fluid in a gaseous state is cooled down by the fluid cooling pipe 22, thereby condensing the working fluid back into a liquid and releasing the latent heat. The liquid then returns from the second to the first portion of the heat pipes through capillary action to cool down the stator and to repeat a cooling cycle.

In another non illustrated embodiment, the first portion of the L-shaped heat pipes of the primary and secondary cooling units are directly fitted into the respective recesses of the stator to avoid one thermal interface.

In the embodiment of FIG. 1, a top side of the housing 70 comprises though-holes 72. During manufacturing, the housing 70 is fixed to the stator cooling assembly 10 by means of screws fitted into the through-holes 72 and screwed into the mounting portions 16 of the stator located between the stator recesses 14. The bottom side of the housing top side is therefore in direct contact with the modular cooling arrangement 20. After motor potting operation, these screws are removed and the housing 70 is thus glued onto the stator cooling assembly 10. During operation, the housing top side, which is a customer interface, is therefore heated. Excessive heating may be however an issue for certain customer applications.

Figure 7:
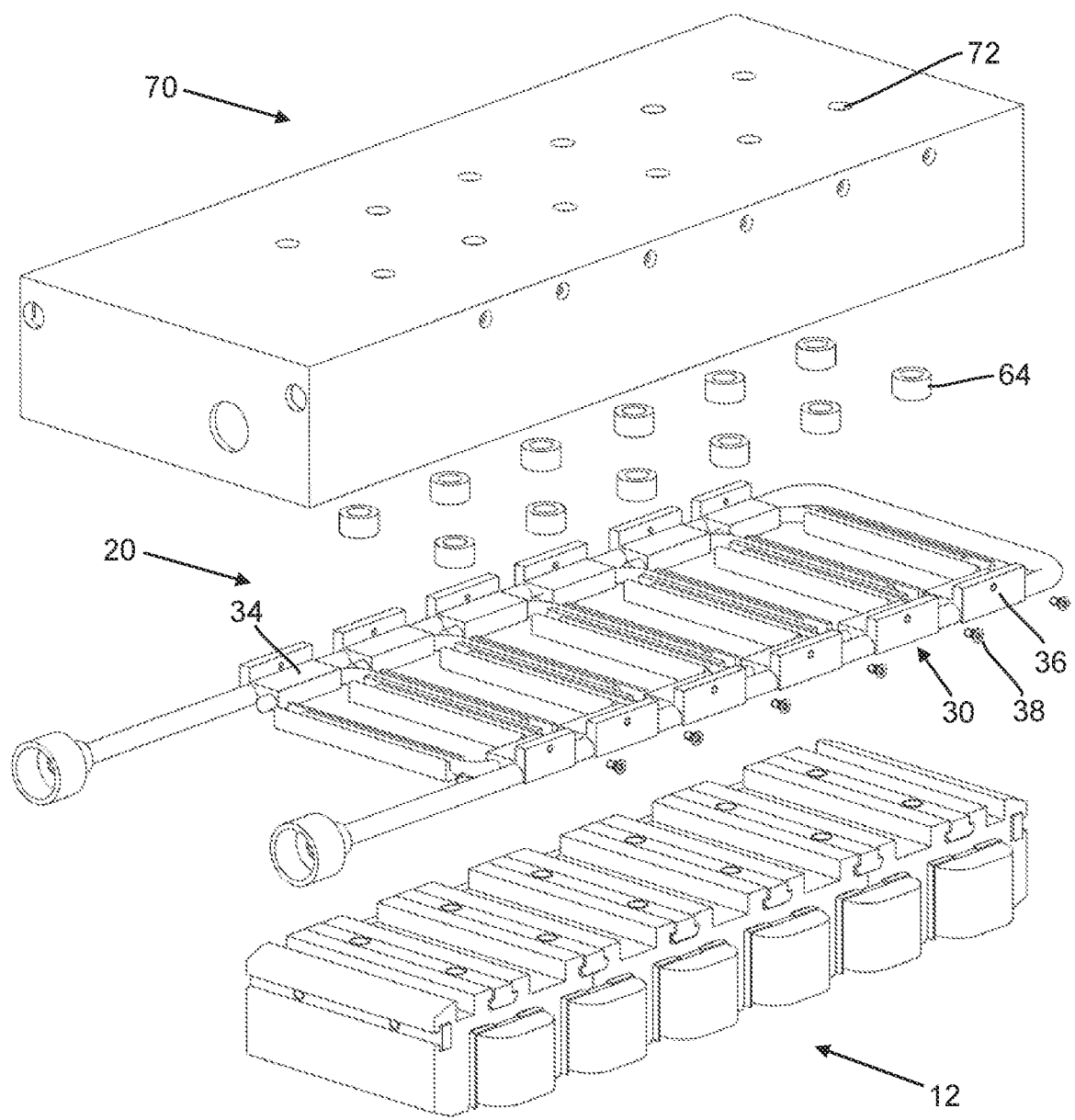
FIG. 7 shows an exploded view of a primary part of a linear motor comprising a stator, a modular cooling arrangement and a housing according to another embodiment of the invention.

The embodiment illustrated in FIG. 7 solve the above issue. Spacers 64 are mounted on the mounting portions 16 of the stator 12 such that a top side of each spacer is in contact against a bottom side of the housing 70 which is opposite the housing top side so as to keep the bottom side away from the modular cooling arrangement to avoid excessive heating of the housing during operation.

Advantageously, the first and second linear segments 23, 25 of the U-shaped fluid cooling pipe 22 are mounted against two opposite longitudinal sides of the housing 70 by means of the connecting members 30 which are fixed to the opposite longitudinal sides so as to cool down the housing.

To this end, each connecting member 30 is designed to have a supporting part 34 supporting the corresponding portions of the L-shaped heat pipes 44a, 44b and of the U-shaped fluid cooling pipe 22, and a fixing part 36 fixed to respective longitudinal sides of the housing by means of screws 38.

Various modifications and variations to the described embodiments of the invention will be apparent to those skilled in the art without departing from the scope of the invention as defined in the appended claims. For example, each primary cooling unit may have just one heat pipe to provide a more cost-effective modular cooling arrangement at the expense of a decrease in cooling efficiency.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST

Stator cooling assembly 10
  Stator 12
    Recess 14
    Mounting portion 16
  Modular cooling arrangement 20
    U-shaped fluid cooling pipe 22
      First linear segment 23
      Inlet port 24
      Second linear segment 25
      Outlet port 26
      Third linear segment 28
    Connecting members 30
      Pipe receiving portions 32a, 32b
        Supporting part 34 ($2^{nd}$ embodiment)
      Fixing part 36 ($2^{nd}$ embodiment)
        Screws 38 ($2^{nd}$ embodiment)
    Central cooling arrangement 40
      Primary cooling units 42
        L-shaped heat pipes 44a, 44b
          First portion 46
          Second portion 48
        Primary inserts 50
          Pipe receiving portions 52a, 52b
      Secondary cooling units 54
        L-shaped heat pipe 56
          First portion 57
          Second portion 58
        Secondary inserts 60
          Groove 62
  Spacer 64 ($2^{nd}$ embodiment)
  Housing 70
    Through-holes 72
  Primary part 80

The invention claimed is:

1. A stator cooling assembly for a linear motor, comprising:
  a stator; and
  a modular cooling arrangement mounted on the stator, the modular cooling arrangement comprising:
    a U-shaped fluid cooling pipe having a first linear segment extending along a first longitudinal side of the stator and a second linear segment extending along a second longitudinal side of the stator, opposite the first longitudinal side,
    an inlet port and an outlet port connected to a free end of the first and second linear segments, respectively, of the U-shaped fluid cooling pipe for circulating a cooling fluid along the first and second longitudinal sides of the stator,
    a central cooling arrangement comprising primary cooling units mounted into respective recesses of the stator extending across the stator from the first to the second longitudinal side, and
    connecting members connecting the central cooling arrangement to the U-shaped fluid cooling pipe,
    wherein each of the primary cooling units comprises at least one heat pipe having a first portion extending along the respective recess of the stator, and a second portion extending along a portion of the U-shaped fluid cooling pipe, and
    wherein the connecting members connect the second portion of the at least one heat pipe of each of the primary cooling units to corresponding portions of the U-shaped fluid cooling pipe.

2. The stator cooling assembly of claim 1, wherein each of the primary cooling units comprises a first and a second L-shaped heat pipe each comprising each the first and second portions, the first portion of the first and second L-shaped heat pipes of each of the primary cooling units extending along the respective recess, and the second portion of the first and second L-shaped heat pipes of each of the primary cooling units extending along a portion of the first and second linear segments, respectively, of the U-shaped fluid cooling pipe.

3. The stator cooling assembly of claim 2, wherein each of the connecting members comprises two pipe receiving portions parallel to each other, a first one of the two pipe receiving portions receiving a portion of one of the first and second linear segments, and a second one of the pipe receiving portions receiving the second portion of one of the first and second L-shaped heat pipes of a corresponding primary cooling unit.

4. The stator cooling assembly of claim 3, wherein the two pipe receiving portions are in a form of grooves extending across the respective connecting member or are in a form of through-holes extending through said the respective connecting member.

5. The stator cooling assembly of claim 2, wherein each of the primary cooling units comprises a primary insert having a first and a second pipe receiving portion parallel to each other and receiving respective first portions of the first and second L-shaped heat pipes.

6. The stator cooling assembly of claim 5, wherein the first and second pipe receiving portions are a first and a second groove.

7. The stator cooling assembly of claim 5, wherein the modular cooling arrangement further comprises two secondary cooling units arranged into respective recesses of the stator extending along both sides of the central cooling arrangement, and wherein each of the secondary cooling units comprises a single L-shaped heat pipe having a first and a second portion extending respectively along the respective recess and along a portion of the first and second linear segments, respectively.

8. The stator cooling assembly of claim 7, wherein each of the secondary cooling units comprises a secondary insert having a single pipe receiving portion receiving the first portion of the single L-shaped heat pipe.

9. The stator cooling assembly of claim 8, wherein the pipe receiving portion is a groove.

10. The stator cooling assembly of claim 8, wherein the primary and secondary inserts of respective primary and secondary cooling units are press-fitted into the respective recesses of the stator.

11. The stator cooling assembly of claim 10, wherein the primary and secondary inserts and the connecting members are made of a metal having a thermal conductivity coefficient exceeding 200 W $m^{-1}$ $K^{-1}$ at 20° C. and 1 bar.

12. The stator cooling assembly of claim 11, wherein the metal is aluminum or copper.

13. The stator cooling assembly of claim 2, wherein the second portion of the first L-shaped heat pipe of each of the primary cooling units extends along the first linear segments in a first direction, and wherein the second portion of the second L-shaped heat pipe of each of the primary units extends along the second linear segment in a second direction opposite the first direction.

14. The stator cooling assembly of claim 1, wherein a cross-section of the L-shaped heat pipes is smaller than a cross-section of the U-shaped fluid cooling pipe.

15. The stator cooling assembly of claim 1, wherein the U-shaped fluid cooling pipe further comprises a third linear segment between the first and second linear segments, the third linear segment extending along a lateral side of the stator.

16. A primary part of a linear motor, comprising the stator cooling assembly of claim 1 and a housing arranged to encapsulate the stator cooling assembly.

17. The primary part of claim 16, further comprising spacers mounted on a mounting portion of the stator such that a top side of each of the spacers is in contact against a bottom side of the housing which is opposite to a top side of the housing so as to keep the bottom side away from the modular cooling arrangement and avoid excessive heating of the housing.

18. The primary part of claim 16, wherein the first and second linear segments of the U-shaped fluid cooling pipe are mounted against two opposite longitudinal sides of the housing by the connecting members which are fixed to the opposite longitudinal sides so as to cool down the housing.

19. A linear motor comprising the primary part of claim 16.

* * * * *